United States Patent [19]

Morinaga et al.

[11] Patent Number: 5,010,132

[45] Date of Patent: Apr. 23, 1991

[54] WATER-BASE PAINT FOR COATING THE INSIDE SURFACE OF METALLIC CAN

[75] Inventors: Akio Morinaga; Takeo Kigami, both ot Ohtake, Japan

[73] Assignee: Mitsui Petrochemical Industries, Ltd., Tokyo, Japan

[21] Appl. No.: 425,953

[22] Filed: Oct. 24, 1989

[30] Foreign Application Priority Data

Oct. 31, 1988 [JP] Japan ................... 63-275494

[51] Int. Cl.$^5$ ........................... C08L 67/02
[52] U.S. Cl. ...................... 524/601; 524/604; 524/707; 524/713; 524/714; 524/742; 524/745; 524/755; 524/792; 528/271; 528/274; 528/286; 528/302; 528/308.6; 428/480; 428/704
[58] Field of Search .............. 524/601, 604, 605, 707, 524/713, 714, 742, 745, 755, 792; 528/271, 274, 286, 302, 308, 308.6; 428/480, 704

[56] References Cited

U.S. PATENT DOCUMENTS

| | | | |
|---|---|---|---|
| 4,186,743 | 2/1980 | Steiger | 428/905 X |
| 4,487,801 | 12/1984 | Turnbull et al. | 428/313.5 |
| 4,535,050 | 8/1985 | Adair et al. | 428/321.5 X |
| 4,720,417 | 1/1988 | Sweeny et al. | 428/201 |
| 4,888,381 | 12/1989 | Pankratz | 524/751 |

Primary Examiner—Morton Foelak
Assistant Examiner—Sam A. Acquah
Attorney, Agent, or Firm—Sherman and Shalloway

[57] ABSTRACT

A water-base paint for coating the inside surface of a metallic can, said paint comprising fine particles of a polyester resin dispersed in an aqueous medium in the presence of a surface-active agent, wherein (A) the polyester resin comprises units derived from a dicarboxylic acid and units derived from a diol, the units derived from the dicarboxylic acid containing units derived from terephthalic acid and units derived from isophthalic acid in a mole ratio of from 10:90 to 80:20, and at least 30 mole % of the units derived from the diol being derived from ethylene glycol, (B) the surface-active agent is composed of at least one compound selected from alkylaryl sulfonic acid salts, alkylsulfonic acid salts, dialkylsulfosuccinic acid salts, alkylphosphoric acid salts, polyoxyethylene alkylarylether sulfonic acid salts and polyoxyethylene alkylether sulfonic acid salts, and (C) the fine particles of the polyester resin have an average particle diameter of not more than 3 microns.

10 Claims, No Drawings

WATER-BASE PAINT FOR COATING THE INSIDE SURFACE OF METALLIC CAN

This invention relates to a water-base paint of the aqueous dispersion type which comprises a thermoplastic polyester as a main component and is useful for coating the inside surface of a metallic can. More specifically, this invention relates to a water-base paint for coating the inside surface of a metallic can which comprises fine particles of a thermoplastic polyester resin very stably dispersed in an aqueous medium.

The inside surfaces of metallic cans for holding drinks such as fruit juices, carbonated beverages and, alcoholic drinks are usually coated for anti-corrosion or preventing degeneration of such contents owing to the dissolving of the metal.

Vinyl chloride/vinyl acetate copolymer, epoxy resins, etc. are mainly used as resins for coating the inside surfaces of such metallic cans.

Japanese Patent Publication No. 10062/1985 discloses a paint for coating the inside surface of a metallic can, comprising as a main component a thermoplastic polyester resin derived from a dicarboxylic acid component at least 90 mole % of which consists of terephthalic acid and a glycol component composed of 30 to 70 mole % of ethylene glycol, 0.1 to 2.5 mole % of a polyethylene glycol having a molecular weight of 60 to 6,000 and the remainder being diethylene glycol.

The above paint comprising the thermoplastic polyester as a main component proves satisfactory for use in coating the inside of a metallic can in respect of adhesion to metal, strength, baking temperature, melting point, etc. However, in the aqueous dispersion type, the dispersed resin particles cannot be sufficiently made small, and the coated film cannot be made sufficiently thin.

On the other hand, from an economic viewpoint, it has recently become necessary to reduce the thickness of a coating on the inside surface of a metallic can.

With the foregoing background, the present inventors made extensive investigations in order to develop a paint of the aqueous dispersion type comprising a thermoplastic polyester as a main component in which the polyester resin particles can be stably dispersed in very fine particles, and which can be coated in a thin layer having no trouble with regard to gas permeability.

These investigations have now led to the discovery that the above purpose can be achieved by using a specific polyester resin derived from a dicarboxylic acid component comprising terephthalic acid and isophthalic acid in a specific ratio, and a specific anionic surface-active agent as a dispersion stabilizer for the polyester resin in an aqueous medium.

Thus, according to this invention, there is provided a water-base paint for coating the inside surface of a metallic can, said paint comprising fine particles of a polyester resin dispersed in an aqueous medium in the presence of a surface-active agent, wherein (A) the polyester resin comprises units derived from a dicarboxylic acid and units derived from a diol, the units derived from the dicarboxylic acid containing units derived from terephthalic acid and units derived from isophthalic acid in a mole ratio of from 10:90 to 80:20, and at least 30 mole % of the units derived from the diol being derived from ethylene glycol, (B) the surface-active agent is composed of at least one compound selected from alkylaryl sulfonic acid salts, alkylsulfonic acid salts, dialkylsulfosuccinic acid salts, alkylphosphoric acid salts, polyoxyethylene alkylarylether sulfonic acid salts and polyoxyethylene alkylether sulfonic acid salts, and (C) the fine particles of the polyester resin have an average particle diameter of not more than 3 microns.

The paint of this invention for coating the inside surface of a metallic can will now be described in greater detail.

Polyester Resin

The polyester resin used in the paint of this invention basically contains units (to be referred to as the "dicarboxylic acid component") derived from a dicarboxylic acid and units (to be referred to as the "diol component") derived from a diol.

The dicarboxylic acid component consists essentially of units derived from terephthalic acid and units derived from isophthalic acid, and may contain third structural units as required. The mole ratio of the units derived from terephthalic acid to the units derived from isophthalic acid is from 10:90 to 80:20, preferably from 30:70 to 10:90, especially preferably from 40:60 to 60:40.

Examples of other dicarboxylic acids that can form the third structural units which may be included as desired are aromatic dicarboxylic acids such as 2,6-naphthalenedicarboxylic acid, 1,5-naphthalenedicarboxylic acid and phthalic acid; alicyclic dicarboxylic acids such as hexahydroterephthalic acid; and aliphatic dicarboxylic acids such as adipic acid, sebacic acid and azelaic acid. These dicarboxylic acids may be used singly or in combination with each other. The content of the units derived from these dicarboxylic acids is not more than 60 mole %, preferably not more than 30 mole %, and especially preferably 20 to 0 mole %, based on the total amount of the dicarboxylic acid component.

On the other hand, at least 30 mole %, preferably at least 35 mole %, especially preferably at least 40 mole %, of the diol component constituting the polyester resin of this invention consists of units derived from ethylene glycol. The diol component may be substantially composed of only the units derived from ethylene glycol, but according to the properties desired of the polyester resin, it may contain units derived from another diol and/or a polyhydric alcohol.

Examples of the other diol are diethylene glycol and polyethylene glycols having a molecular weight of 600 to 6,000. They may be used singly or in combination with each other. The content of the units derived from the other diol is at most 70 mole %, preferably at most 75 mole %, especially preferably 50 to 0 mole %, of the total amount of the diol component.

Examples of the polyhydric alcohol containing at least 3 hydroxyl groups are trimethylmethane, trimethylolethane and trimethylolpropane. If the content of the units derived from the polyhydric alcohols is too high, the resulting polyester resin is susceptible to gellation. Desirably, therefore, it is limited to at most 10 mole %, preferably not more than 5 mole %, especially preferably not more than 3 mole %.

The above polyester resin composed of the dicarboxylic acid component and the diol component can be produced by esterification reaction of the dicarboxylic acids and the diols in accordance with a known method. It may also be produced by mixing the dicarboxylic acid ester and the diol, performing ester-interchange reaction of the dicarboxylic acid ester, and further subjecting the materials to polycondensation reaction. The esterification reaction or the polycondensation reaction may be carried out in the presence of a catalyst such as germanium oxide, antimony trioxide, tetrabutyltitanate, tetrabutoxy titanate, manganese acetate, calcium acetate, zinc acetate, lead acetate or p-toluenesulfonic acid. Additives normally used in the field of paints include, for example, antioxidants, flow regulating agents and blocking preventing agents.

The polyester resin used in the paint of this invention is film-forming. Usually, the polyester resin has an intrinsic viscosity, measured in ortho-fluorophenol at 25° C., of 0.4 to 1.5 dl/g, preferably 0.6 to 1.2 dl/g.

Surface-active Agent

In the preparation of the water-base paint of this invention, at least one anionic surface-active agent is used as a dispersing agent for dispersing the polyester resin in an aqueous medium. This is one feature of the present invention. Such surface-active agents are selected from alkylarylsulfonic acid salts, alkylsulfonic acid salts, dialkylsulfosuccinic acid salts, alkylphosphoric acid salts, polyoxyethylene alkylarylether sulfonic acid salts and polyoxyethylene alkylether sulfonic acid salts.

The use of the above-described specific anionic surface-active agent enables the polyester resin stable in an aqueous medium as fine particles with an average particle diameter of not more than 3 microns.

Specific examples of the anionic surface-active agents that can be used in this invention will be cited below.

Examples of the alkylarylsulfonic acid salts include sodium alkylbenzenesulfonates, potassium alkylbenzenesulfonates, ammonium alkylbenzenesulfonates, triethanolamine alkylbenzenesufonates, sodium alkylnaphthalenesulfonates, potassium alkylnaphthalenesulfonates and ammonium alkylnaphthalenesulfonates. The alkyl groups in these alkylarylsulfonic acid salts are preferably long-chain alkyl groups having 10 to 22 carbon atoms. Sodium dodecylbenzenesulfonate is especially preferred among these alkylarylsufonates.

Examples of the alkylsulfonic acid salts are sodium alkylsulfonates, potassium alkylsufonates, ammonium alkylsulfonates, and triethanolamine alkylsulfonates. The alkyl groups in these alkylsulfonates are preferably those having 10 to 22 carbon atoms. Sodium alkylsulfonates are preferred.

Sodium di-(2-methylhexyl)sulfosuccinate is preferred as the dialkylsulfosuccinate.

The alkylphosphonates may be, for example, diethanolamine alkylphosphates. The alkyl moiety in the alkylphosphates preferably has 8 to 22 carbon atoms. The alkyl moiety in the ammonium polyoxyethylene alkylarylether sulfonates preferably contains 8 to 22 carbon atoms, and the aryl moiety is preferably a phenyl group.

Examples of the polyoxyethylene alkylether sulfonates are sodium polyoxyethylene alkylether sulfonates. The alkyl moiety preferably has 8 to 22 carbon atoms.

In the present invention, the above alkylarylsulfonates, alkylsulfonates, dialkylsulfosuccinates, alkylphosphates, polyoxyethylene alkylarylether sulfonates and polyoxyethlene alkylether sulfonates may be used singly or in combination with one another.

Especially preferred among the above-named surface-active agents for use in this invention are alkylbenzenesulfonate salts such as sodium dodecylbenzenesulfonate.

The amount of the surface-active agent used is not critical and may be varied depending upon the type of the polyester resin and the type of the surface-active agent. Generally, it is 0.2 to 20 parts by weight, preferably 0.25 to 10 parts by weight, especially preferably 0.5 to 5.0 parts by weight, per 100 parts by weight of the polyester resin.

Preparation of the Water-base Paint

The water-base paint of this invention may be prepared by any known method by which the polyester resin can be dispersed in an aqueous medium in the presence of the specific surface-active agent as fine particles having an average particle diameter of not more than 3 microns. One specific method comprises dissolving the polyester resin in an organic solvent, dispersing the resulting organic solvent solution of the polyester in an aqueous medium containing the specific surface-active agent and then removing the organic solvent.

The organic solvent for the polyester is suitably one which has a great dissolving power for the polyester resin and can be easily removed from the dispersion obtained by dispersing the organic solvent solution of the polyester resin in the aqueous medium. Examples of such an organic solvent include aromatic hydrocarbons such as benzene, toluene, xylene and ethylbenzene; alicyclic hydrocarbons such as cyclohexane, cyclopentane and methylcyclopentane; halogenated hydrocarbons such as chloroform, methylene chloride, carbon tetrachloride, 1,1-dichloroethane, trichloroethane, tetrachloroethane, chlorobenzene, 1,3-dichloro-2-methylpropane and o-chlorotoluene; cyclic ethers such as 1,4-dioxane; and acetophenone and anisole. These organic solvents may be used singly or in combination with each other. Among the above organic acids, those having a boiling point of 30 to 160° C. are preferred. Methylene chloride and anisole are especially preferred.

The concentration of the polyester resin in the organic solvent is not particularly limited, and may be one in which the polyester resin can be dissolved. In view of handleability in the coating operation and dispersibility in the dispersing operation, the concentration of the polyester resin is preferably 1 to 20% by weight in general, and 5 to 15% by weight in particular.

The surface-active agent may be added to an organic solvent solution of the polyester resin. It is preferred however to use a method in which the surface-active agent is added to an aqueous medium such as water to prepare a uniform aqueous solution, and then the aqueous solution is mixed with the organic solvent solution of the polyester resin with stirring at a high speed to disperse the polyester resin (including the organic solvent) in the aqueous solution.

The concentration of the surface-active agent in the aqueous solution is not critical. Conveniently, it is generally 0.01 to 10% by weight, preferably 0.1 to 3% by weight.

Mixing of the organic solvent solution of the polyester resin and the aqueous solution of the surface-active agent is carried out by using a high-speed stirring device such as a homomixer. The stirring conditions may be set so that the average particle size of the dispersed phase (the organic solvent solution of the polyester resin) will become not more than about 3 microns. Specifically, the stirring speed is usually 3,000 to 15,000 rpm, and the stirring time is usually 2 to 120 minutes.

After the polyester resin containing the organic solvent is dispersed in the aqueous medium, the organic solvent is removed by, for example, heating the dispersion of the polyester resin containing the organic solvent under reduced pressure to a temperature near the boiling point of the organic solvent by using an evaporator or the like.

As a result of removing the organic solvent, an aqueous dispersion is obtained in which fine particles of the polyester resin having an average particle diameter of not more than 3 microns, preferably not more than 2 microns, especially preferably not more than 1 micron, are dispersed in the aqueous medium stably by the aid of the surface-active agent.

The content of the fine polyester resin particles in the aqueous dispersion is not strictly limited, and can be varied over a wide range according to, for example, the method of coating the paint of this invention. Generally, the suitable content of the fine polyester resin particles is 10 to 70% by weight, preferably 20 to 60% by weight, especially preferably 25 to 50% by weight, based on the weight of the aqueous dispersion. The aqueous dispersion so prepared has very superior dispersion stability since the fine polyester resin particles are stably dispersed in the aqueous medium by the specific surface-active agent. The adjoining fine particles do not agglomerate, and even with the lapse of time, the fine particles hardly agglomerate and change in particle diameter.

As stated hereinabove, the aqueous paint of this invention for coating the inside surface of a metallic can is prepared by dispersing the specific polyester resin in the aqueous medium by using the specific surface-active agent. Hence, the polyester resin is very well dispersed as very fine particles with good dispersion stability, and the dispersed fine particles hardly change in particle size owing to agglomeration.

Furthermore, since the paint of this invention is an aqueous dispersion of the polyester resin particles, it does not contaminate the working environment by organic solvent as is the case with an organic solvent dispersion, nor does it require a large-sized apparatus as in the case of using a powder paint.

In addition, the coated layer of the paint of this invention on the inside of a metallic can does not give off a malodor as in the case of using an epoxy resin, for example, because its main component is the polyester resin.

The water-base paint of this invention can be coated on the inside surface of a metallic container for holding drinks or the like by methods known per se, for example spray coating, roll coating or flow coating.

In a preferred embodiment, the polyester resin is dispersed in the aqueous medium as completely spherical particles, and the water-base paint of the invention can also be used as an anti-blocking agent for films, and an abrasion resistance improving agent for spacers and inks.

The following examples illustrate the present invention more specifically. It should be understood however that the scope of the invention is by no means limited by these examples.

The average particle diameter of the polyester resin, as used in the present specification and the appended claims, is measured by a microtrack particle size analyzer (supplied by Leeds & Northrup Instruments Nikkisou Co., Ltd.).

EXAMPLE 1

A slurry composed of 50 parts by weight of terephthalic acid, 50 parts by weight of isophthalic acid and 100 parts by weight of ethylene glycol was fed into a continuous esterification reactor, and esterified at 250° C. under atmospheric pressure to give a reaction product having an esterification degree of 95%. Germanium dioxide (0.016 part by weight) as a catalyst was added per 124 parts by weight of the esterification product, and polycondensation was carried out at 280° C. under a reduced pressure of 0.5 mmHg. The polycondensation reaction product was extruded as a strand from a nozzle, cooled and cut to obtain a prepolymer. The prepolymer was subjected to a preliminary crystallization treatment in a vacuum dryer at 160° C. for 2 hours. Subsequently, 400 g of the treated product was introduced into a vacuum tumbler-type solid-phase polymerization device and subjected to solid phase polymerization.

The resulting polyester resin (terephthalic acid-/isophthalic acid/ethylene glycol=50 moles/50 moles/100 moles) had an intrinsic viscosity, measured in orthochlorophenol at 25° C., of 0.8 dl/g.

Twenty grams of the polyester resin was dissolved in 180 g of methylene chloride to obtain a 10% by weight solution of the polyester resin (solution A).

Separately, 4 g of sodium dodecylbenzene-sulfonate (NEOPELEX F-25, a surface-active agent produced by Kao Co., Ltd.; concentration 25% by weight) was dissolved in 96 g of distilled water to give an aqueous solution (B) of the surface-active agent in a concentration of 1% by weight.

Then, 200 g of the solution (A) and 100 g of the aqueous solution (B) were put in a 0.5-liter homomixer, and stirred at 10,000 rpm and 15° C. for 1.0 hour to disperse the polyester resin in water.

The resulting aqueous dispersion was heated at 35 to 45° C. under atmospheric pressure for 3 hours by using an evaporator to evaporate the methylene chloride substantially.

The polyester resin was dispersed as fine particles having an average particle diameter of 0.6 micron in the resulting aqueous dispersion. The dispersed state of the particles was very good and stable with the lapse of time.

EXAMPLE 2

Example 1 was repeated except that triethanolamine laurylsulfate (EMAL TD, a tradename for a product of Kao Co., Ltd.) was used instead of sodium dodecylbenzensulfonate.

The fine polyester resin particles in the resulting aqueous dispersion had an average particle diameter of 0.9 micron.

EXAMPLE 3

Example 1 was repeated except that ammonium laurylsulfate (EMAL AD-25R, a tradename for a product of Kao Co., Ltd.) was used instead of sodium dodecylbenzene-sulfonate.

The fine polyester particles dispersed in the resulting aqueous dispersion had an average particle diameter of 1.2 microns, and their state of dispersion was very good.

EXAMPLE 4

Example 1 was repeated except that sodium alkane-sulfonate (RATEMUL PS, a tradename for a product of Kao Co., Ltd.) was used instead of sodium dodecylbenzene-sulfonate.

The fine polyester particles dispersed in the resulting aqueous dispersion had an average particle diameter of 2.8 microns, and their state of dispersion was very good.

EXAMPLE 5

Example 1 was repeated except that sodium laurylsulfate (EMAL 10 powder, a tradename for a product of Kao Co., Ltd.) was used instead of sodium dodecylbenzenesulfonate.

The fine polyester particles dispersed in the resulting aqueous dispersion had an average particle diameter of 2.8 microns, and their state of dispersion was very good.

EXAMPLE 6

Example 1 was repeated except that sodium dialkylsulfosuccinate (PELEX CS, a tradename for a product of Kao Co., Ltd.) was used instead of sodium dodecylbenzenesulfonate.

The fine polyester particles dispersed in the resulting aqueous dispersion had an average particle diameter of 2.2 microns, and their state of dispersion was very good.

EXAMPLE 7

Example 1 was repeated except that sodium dialkylsulfosuccinate (PELEX TO-P, a tradename for a product of Kao Co., Ltd.) was used instead of sodium dodecylbenzenesulfonate.

The fine polyester particles dispersed in the resulting aqueous dispersion had an average particle diameter of 1.3 microns, and their state of dispersion was very good.

EXAMPLE 8

Example 1 was repeated except that diethanolamine alkylphosphate (ELECTROSTRIPPER-N, a tradename for a product of Kao Co., Ltd.) was used instead of sodium dodecylbenzenesulfonate.

The fine polyester particles dispersed in the resulting aqueous dispersion had an average particle diameter of 1.2 microns, and their state of dispersion was very good.

EXAMPLE 9

Example 1 was repeated except that anisole was used as the organic solvent instead of methylene chloride.

The polyester resin particles in the resulting aqueous dispersion had an average particle diameter of 0.9 micron.

COMPARATIVE EXAMPLE 1

Example 1 was repeated except that a sorbitan-type nonionic surface-active agent having an HLB of 8.6 (RHEODOL SP-L10, a tradename for a product of Kao Co., Ltd.) was used instead of sodium dodecylbenzenesulfonate. The polyester resin could not be dispersed well.

COMPARATIVE EXAMPLE 2

Example 1 was repeated except that a sorbitan-type nonionic surface active agent having an HLB value of 4.3 (RHEODOL SP-110, a tradename for a product of Kao Co., Ltd.) was used instead of sodium dodecylbenzenesulfonate. The polyester resin could not be well dispersed in water.

COMPARATIVE EXAMPLE 3

Example 1 was repeated except that monoglyceride of medium purity having an HLB of 2.8 (EXEL 300, a product of Kao Co., Ltd.) was used instead of sodium dodecylbenzenesulfonate. The polyester resin could not be well dispersed in water.

COMPARATIVE EXAMPLE 4

Example 1 was repeated except that a sorbitan-type nonionic surface active agent having an HLB value of 1.8 (RHEODOL SP-030, a tradename for a product of Kao Co., Ltd.) was used instead of sodium dodecylbenzenesulfonate. The polyester resin could not be well dispersed in water.

COMPARATIVE EXAMPLE 5

Example 1 was repeated except that POE type nonionic surface-active agent having an HLB of 10.5 (EMULGEN 705, a tradename for a product of Kao Co., Ltd.) was used instead of sodium dodecylbenzenesulfonate. The polyester resin could not be well dispersed in water.

COMPARATIVE EXAMPLE 6

Example 1 was repeated except that POE type nonionic surface-active agent (EMULGEN 931, HLB 17.2, a tradename for a product of Kao Co., Ltd.) was used instead of sodium dodecylbenzenesulfonate. The polyester resin could not be well dispersed in water.

COMPARATIVE EXAMPLE 7

Example 1 was repeated except that potassium oleate was used instead of sodium dodecylbenzene-sulfonate. The polyester resin could not be well dispersed in water.

COMPARATIVE EXAMPLE 8

Example 1 was repeated except that a saponification product of polyvinyl acetate (PVA GH-17, a tradename for a product of Nihon Gosei Co., Ltd.) was used instead of sodium dodecylbenzenesulfonate.

The resulting polyester resin particles in the aqueous dispersion had an average particle diameter of 4.9 microns. The dispersed state of the particles was good immediately after dispersion. But with time, it became unstable. As the time elapsed, the particles agglomerated and within a short period of time, the polyester particles sedimented and could not be redispersed.

EXAMPLE 10

By using a slurry composed of 50 parts by weight of terephthalic acid, 50 parts of isophthalic acid and 50 parts by weight of ethylene glycol, a prepolymer and a polymer were synthesized in the same way as in Example 1.

The polymer was then treated in the same way as in Example 1 to give an aqueous dispersion of the polyester resin. The fine polyester resin particles in the aqueous dispersion had an average particle diameter of 1.0 micron.

EXAMPLE 11

By using a slurry composed of 70 parts by weight of terephthalic acid, 30 parts of isophthalic acid and 100 parts by weight of ethylene glycol, a prepolymer and a polymer were synthesized in the same way as in Example 1.

The polymer was then treated in the same way as in Example 1 to give an aqueous dispersion of the polyester resin. The fine polyester resin particles in the aqueous dispersion had an average particle diameter of 1.0 micron.

EXAMPLE 12

By using a slurry composed of 40 parts by weight of terephthalic acid, 60 parts of isophthalic acid and 100 parts by weight of ethylene glycol, a prepolymer and a polymer were synthesized in the same way as in Example 1.

The polymer was then treated in the same way as in Example 1 to give an aqueous dispersion of the polyester resin. The fine polyester resin particles in the aqueous dispersion had an average particle diameter of 1.1 microns.

COMPARATIVE EXAMPLE 9

By using a slurry composed of 100 parts by weight of terephthalic acid and 100 parts by weight of ethylene glycol, a prepolymer and a polymer were synthesized in the same way as in Example 1.

The polymer was then treated in the same way as in Example 1 to give an aqueous dispersion of the polyester resin. The fine polyester resin particles in the aqueous dispersion had an average particle diameter of 9.8 microns.

Each of the aqueous dispersions obtained in Examples 1 to 12 was coated on an aluminum or iron plate, and the coating was subjected to a crosscut tape test. The result was 100/100 in all runs, and the coated films showed good adhesion. When the coated iron plates were left to stand for one month, no rust occurred.

Separately, the paint prepared in Comparative Example 9 was coated on an aluminum or iron plate and the coated plate was subjected to a crosscut tape test. The result was 100/100. But when the coated iron plate was left to stand for one month, rust occurred.

We claim:

1. A water-base paint for coating the inside surface of a metallic can, said paint comprising fine particles of a polyester resin dispersed in an aqueous medium in the presence of a surface-active agent and being prepared by mixing a solution of the polyester resin in an organic solvent selected from the group consisting of halogenated hydrocarbons and anisole with an aqueous medium containing a surface-active agent with stirring at a high speed to disperse the polyester resin and removing the organic solvent, wherein (A) the polyester resin comprises units derived from a dicarboxylic acid and units derived from a diol, the units derived from dicarboxylic acid containing units derived from terephthalic acid and units derived from isophthalic acid in a mole ratio of from 10:90 to 80:20, and at least 30 mole % of the units derived from the diol being derived from ethylene glycol, (B) the surface-active agent is composed of at least one compound selected from the group consisting of alkylaryl sulfonic acid salts, alkylsulfonic acid salts, dialkylsulfosuccinic acid salts, alkylphosphoric acid salts, polyoxyethylene alkylarylether sulfonic acid salts and polyoxyethylene alkylether sulfonic acid salts, and (C) the fine particles of the polyester resin have an average particle diameter of not more than 3 microns.

2. The water-base paint of claim 1 in which the proportion of the units derived from a dicarboxylic acid is such that the mole ratio of the units derived from terephthalic acid to the units derived from isophthalic acid is from 30:70 to 70:30.

3. The water-base paint of claim 1 in which the units derived from a diol contains at least 35 mole % of units derived from ethylene glycol.

4. The water-base paint of claim 1 in which the polyester resin has an intrinsic viscosity, measured in o-fluorophenol at 25° C., of 0.4 to 1.5 dl/g.

5. The water-base paint of claim 1 in which the surface-active agent is a dodecylbenzenesulfonic acid salt.

6. The water-base paint of claim 1 in which the surface-active agent is used in an amount of 0.2 to 20 parts by weight per 100 parts by weight of the polyester resin.

7. The water-base paint of claim 6 in which the surface-active agent is used in an amount of 0.05 to 10 parts by weight per 100 parts by weight of the polyester resin.

8. The water-base paint of claim 1 in which the polyester resin particles have an average particle diameter of not more than 2 microns.

9. The water-base paint of claim 1 in which the organic solvent has a boiling point of 30 to 150° C.

10. The water-base paint of claim 1 wherein the organic solvent is methylene chloride.

* * * * *